United States Patent
Chen et al.

(10) Patent No.: US 10,876,444 B2
(45) Date of Patent: Dec. 29, 2020

(54) ELECTRIC VALVE DEVICE, FRESH AIR PASSAGE MECHANISM, AND INTERNAL-COMBUSTION ENGINE

(71) Applicant: NIDEC TOSOK CORPORATION, Kanagawa (JP)

(72) Inventors: Dongming Chen, Kanagawa (JP); Tomohiko Nakanishi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/576,795

(22) Filed: Sep. 20, 2019

(65) Prior Publication Data

US 2020/0102864 A1 Apr. 2, 2020

(30) Foreign Application Priority Data

Sep. 28, 2018 (JP) ................................. 2018-185301

(51) Int. Cl.
*F01M 13/00* (2006.01)
*F02M 25/06* (2016.01)

(52) U.S. Cl.
CPC ........ *F01M 13/0011* (2013.01); *F02M 25/06* (2013.01); *F01M 2013/0022* (2013.01); *F01M 2013/0044* (2013.01)

(58) Field of Classification Search
CPC ....... F01M 13/0011; F01M 2013/0022; F01M 2013/0044; F02M 25/06; F02M 25/07
See application file for complete search history.

(56) References Cited

U.S. PATENT DOCUMENTS

| | | | | |
|---|---|---|---|---|
| 5,771,869 A * | 6/1998 | Yoshihara | ............... | F02M 26/49 123/568.16 |
| 6,035,835 A * | 3/2000 | Shigihama | ............. | F02M 26/57 123/568.16 |
| 8,844,507 B2 * | 9/2014 | Kitayama | .......... | F01M 13/0011 123/572 |
| 2008/0058994 A1 * | 3/2008 | Tsuda | .................... | F02D 41/221 700/282 |

FOREIGN PATENT DOCUMENTS

| | | |
|---|---|---|
| JP | H09126342 | 5/1997 |
| JP | H10184336 | 7/1998 |

* cited by examiner

*Primary Examiner* — Syed O Hasan
(74) *Attorney, Agent, or Firm* — JCIPRNET (57) ABSTRACT

Provided is an electric valve device which is capable of improving the accuracy of detecting whether there is a gas leakage from a blow-by gas passage and capable of detecting detachment of the electric valve device from a pipe of a fresh air passage. The electric valve device includes an inflow side pipe portion, an outflow side pipe portion, a barrier which partitions off the inflow side pipe portion from the outflow side pipe portion, a valve body which opens and closes an opening arranged on the barrier by moving in the axial direction, and a solenoid which drives the valve body. The inflow side pipe portion includes a bypass path which communicates with the outflow side pipe portion through a second opening separately from a passage which communicates with the outflow side pipe portion through a first opening used as the opening.

4 Claims, 7 Drawing Sheets

ELECTRIC VALVE DEVICE, FRESH AIR PASSAGE MECHANISM, AND INTERNAL-COMBUSTION ENGINE

CROSS-REFERENCE TO RELATED APPLICATION

This application claims the priority of Japan patent application serial no. 2018-185301, filed on Sep. 28, 2018. The entirety of the above-mentioned patent application is hereby incorporated by reference herein and made a part of this specification.

BACKGROUND

Technical Field

The disclosure relates to an electric valve device, a fresh air passage mechanism, and an internal-combustion engine, in which an electric valve represented by a solenoid valve is disposed in a pipe.

Related Art

Conventionally, an electric valve is known which includes an inflow side pipe portion, an outflow side pipe portion, a barrier that partitions off the inflow side pipe portion from the outflow side pipe portion, a valve body that opens and closes an opening of the barrier by moving in the axial direction, and a driving portion that drives the valve body.

For example, the electric valve described in patent literature 1 includes an inflow chamber used as the inflow side pipe portion, an outflow chamber used as the outflow side pipe portion, a barrier which partitions off the inflow chamber from the outflow chamber, a valve body which opens and closes an opening arranged on the barrier by moving in the axial direction, and a solenoid used as the driving portion. The valve body is connected to a leading end portion in the axial direction of a plunger of the solenoid. When a current is supplied to a coil of the solenoid and the plunger moves in a direction approaching the barrier along the axial direction, the valve body connected to the leading end portion of the plunger is pressed to the barrier to block the opening. The valve body blocks the opening, and thereby the flow of a fluid from the inflow chamber to the outflow chamber through the opening is cut off. On the other hand, when the current supply to the coil of the solenoid is stopped and the plunger moves in a direction away from the barrier along the axial direction due to an urging force of a spring, the valve body connected to the leading end portion of the plunger is spaced apart from the barrier to expose the opening. The valve body exposes the opening, and thereby the fluid flows from the inflow chamber to the outflow chamber through the opening.

The electric valve having this configuration is used in various applications. For example, the internal-combustion engine described in patent literature 2 is used as a flow control valve for PCV (Positive Crankcase Ventilation) system (hereinafter referred to as a PCV valve) and is disposed in a blow-by gas passage. The blow-by gas passage is a passage for returning a blow-by gas which leaks from between a piston and a cylinder of an engine of an automobile or the like into a crankcase to an intake path of the engine. Based on the situation that an area on the downstream side of a throttle valve of the intake path becomes an area in negative pressure, the PCV valve is opened at a duty already set and the blow-by gas is returned to the intake path. At this time, fresh air flows into the crankcase through a communication passage communicating an area on the upstream side of the throttle valve of the intake path and the crankcase. The communication passage is a passage for sending fresh air into the crankcase, and thus is generally referred to as a fresh air passage.

In the internal-combustion engine described in patent literature 2, a leakage of the blow-by gas from the blow-by gas passage caused by pipe detachment is detected based on pressure changes in the blow-by gas passage.
[Patent literature 1] Japanese Laid-Open No. H09-126342
[Patent literature 2] Japanese Laid-Open No. H10-184336

SUMMARY

An exemplary first aspect of the application is an electric valve device which includes an inflow side pipe portion, an outflow side pipe portion, a barrier that partitions off the inflow side pipe portion from the outflow side pipe portion, a valve body that opens and closes an opening arranged on the barrier by moving in the axial direction, and a driving portion that drives the valve body. The inflow side pipe portion includes a passage which communicates with the outflow side pipe portion through the opening treated as a first opening and a bypass path which is separated from the passage and communicates with the inflow side pipe portion through a second opening.

DESCRIPTION OF THE EMBODIMENTS

The inventors have found that the accuracy of detecting whether there is a gas leakage from the blow-by gas passage can be improved by detecting the pressure changes in the crankcase when the electric valve arranged in the fresh air passage is closed instead of detecting the pressure changes in the blow-by gas passage. However, in this detection method, there is a problem that the detachment of the electric valve arranged in the fresh air passage from the inflow side pipe of the fresh air passage cannot be detected.

When the electric valve detaches from the inflow side pipe of the fresh air passage, the pressure changes of the crankcase when the electric valve is closed cannot be detected properly for the air flowing from the opening of the pipe to the intake path. Therefore, when the electric valve detaches from the inflow side pipe of the fresh air passage, the accuracy of detecting whether there is a gas leakage from the blow-by gas passage is reduced.

The disclosure provides an electric valve device which is capable of improving the accuracy of detecting whether there is a gas leakage from a blow-by gas passage and is capable of detecting detachment of an electric valve from a pipe of a fresh air passage.

According to the exemplary first aspect of the application, an electric valve device is provided which is capable of detecting a gas leakage from a pipe of a blow-by gas passage with high accuracy and detecting detachment of an electric valve from a pipe of a fresh air passage.

One embodiment of an internal-combustion engine of the disclosure is described below with reference to the drawings.

In the following drawings, in order to make each configuration easy to understand, the scale, the number and the like may be different in each structure and the actual structures.

In addition, in the drawings, an XYZ coordinate system is appropriately shown as a three-dimensional orthogonal coordinate system. In the XYZ coordinate system, the Z-axis direction is a direction parallel to the axial direction of a central axis J shown in FIG. 2. The X-axis direction is a direction parallel to a short-side direction of an electric valve device 1 shown in FIG. 2. The Y-axis direction is a direction orthogonal to both the X-axis direction and the Z-axis direction.

In addition, in the following description, a positive side of the Z-axis direction (+Z side) is described as a "rear side", and a negative side of the Z-axis direction (−Z side) is described as a "front side". Besides, the rear side and the front side are terms used merely for description and do not limit an actual positional relationship or direction. In addition, unless otherwise noted, the direction (the Z-axis direction) parallel to the central axis J is simply described as an "axial direction"; the radial direction centered on the central axis J is simply described as a "radial direction"; and the peripheral direction centered on the central axis J, that is, the axial periphery of the central axis J (θ direction) is simply described as a "peripheral direction".

Besides, in the specification, extending in the axial extension includes a case of extending in a direction inclined in a range of smaller than 45° with respect to the axial direction, in addition to a case of exactly extending in the axial direction (the Z-axis direction). In addition, in the specification, extending in the radial extension includes a case of extending in a direction inclined in a range of smaller than 45° with respect to the radial direction, in addition to a case of exactly extending in the axial direction, that is, a direction perpendicular to the radial direction (the Z-axis direction).

Figure 1:
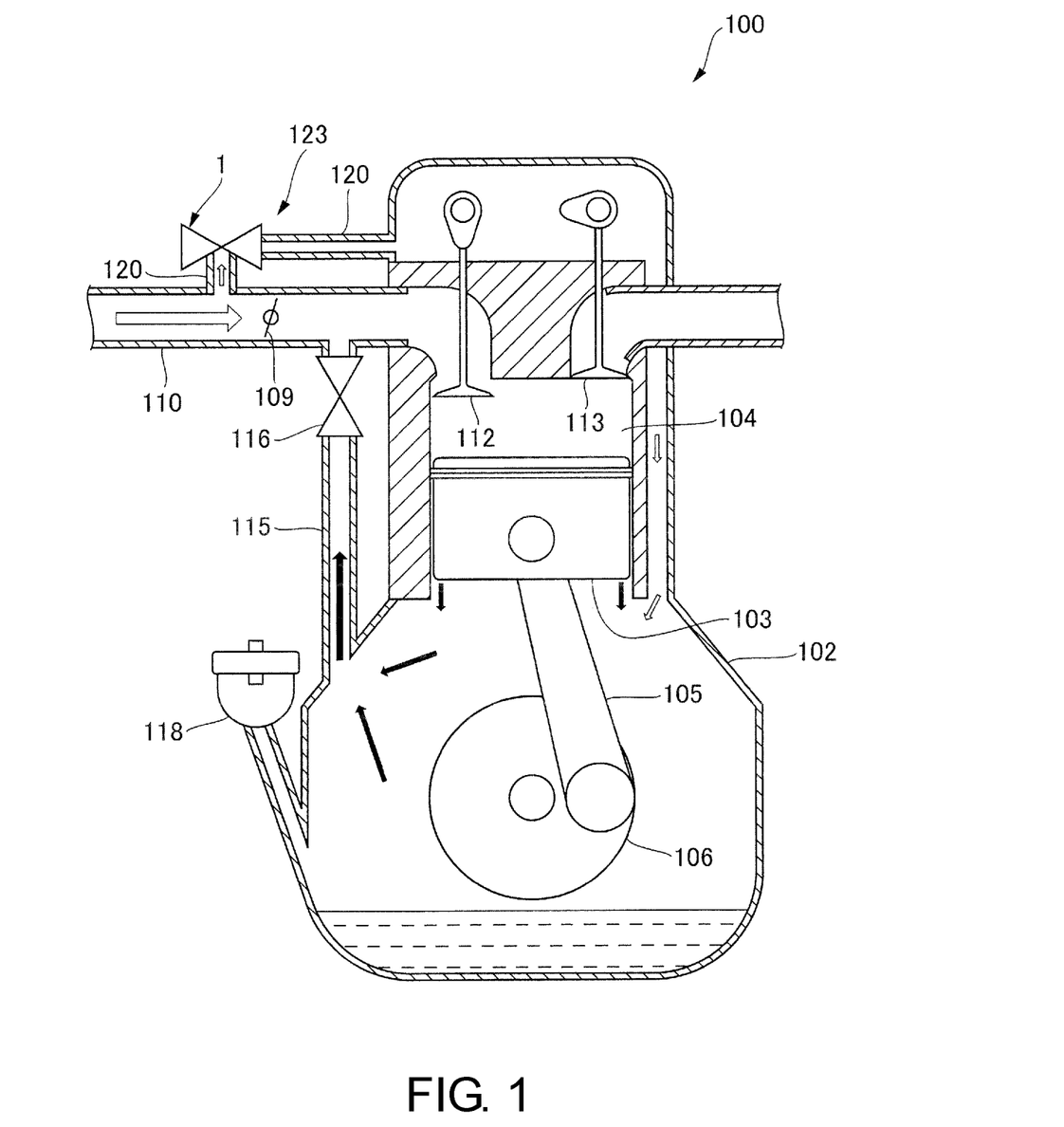
FIG. 1 is a schematic diagram showing an internal-combustion engine of an embodiment.

FIG. 1 is a schematic diagram showing an internal-combustion engine 100 of an embodiment. The internal-combustion engine 100 is a multi-gas-cylinder engine which includes plural sets of pistons 103 and cylinders for accommodating the pistons 103. The cylinders are arranged above a crankcase 102 and enclose the pistons 103. In FIG. 1, only one cylinder and one piston 103 are shown for convenience. The piston 103 moves in the longitudinal direction of the gas cylinder in the gas cylinder of the cylinder. Along with the movement, a connecting rod 105 coupled to the piston 103 rotates a crankshaft 6. A combustion chamber 104 is disposed above the piston 103. A spark plug for igniting fuel is arranged in the combustion chamber 104.

An intake valve 112 is arranged at an intake port of the combustion chamber 104. An exhaust valve 113 is arranged at an exhaust port of the combustion chamber 104. Both the intake valve 112 and the exhaust valve 113 are valves that are opened and closed by a variable valve timing (VVT) mechanism.

An intake passage 110 which is used as an intake path is coupled to the intake port of the combustion chamber 104. A throttle valve 109 is disposed in the intake passage 110. Fresh air sucked into the intake passage 110 is sucked into the combustion chamber 104 via the throttle valve 109 and the intake valve 12 in order. The gas right before being sucked into the combustion chamber 104 is mixed with fuel injected from an injector in the intake passage 110. The fuel that enters the combustion chamber 104 with the fresh air is ignited by the spark plug. The fuel burned by this ignition increases in volume due to vaporization and makes the piston 103 move in a direction away from the spark plug.

Gas produced by the combustion of the fuel in the combustion chamber 104 is discharged as exhaust gas from the exhaust port of the combustion chamber 104 via the exhaust valve 113 and the exhaust passage.

The internal-combustion engine 100 includes a blow-by gas passage 115 for joining the crankcase 102 and an area on the downstream side of the throttle valve 109 in the intake passage 110. In addition, the internal-combustion engine 100 includes a fresh air passage 120 for joining the crankcase 102 and an area on the upstream side of the throttle valve 109 in the intake passage 110. A PCV valve 116 is arranged in the blow-by gas passage 115. The electric valve device 1 is arranged in the fresh air passage 120. A fresh air passage mechanism 123 is configured by the fresh air passage 120 and the electric valve device 1. A pressure sensor 118 which detects the pressure in the crankcase is arranged in the crankcase 102.

When the electric valve device 1 is closed, fresh air does not flow from the fresh air passage 120 into the crankcase 102, and negative pressure in the crankcase is increased. When pipes constitute the blow-by gas passage 115 detach or are damaged, the blow-by gas in the blow-by gas passage 115 leaks out. Then, the negative pressure in the crankcase when the electric valve device 1 is closed is decreased compared with a case of no leakage. By detecting the pressure changes by the pressure sensor, the accuracy of detecting whether there is a leakage of the blow-by gas is improved.

The electric valve device 1 of the embodiment is described below. The electric valve device 1 is arranged in the fresh air passage 120.

<Overall Structure>

Figure 2:
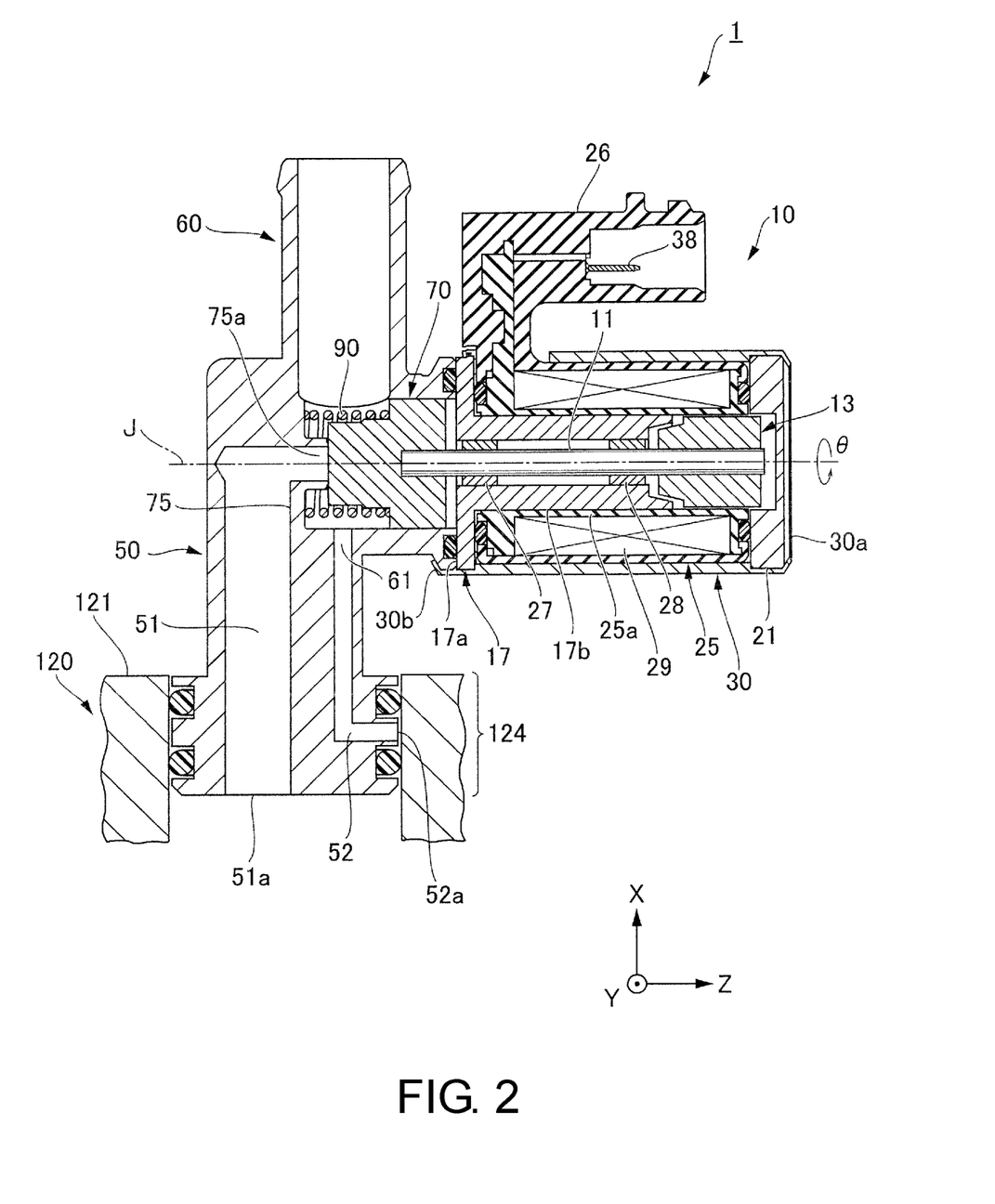
FIG. 2 is a cross-sectional view of an electric valve device of the internal-combustion engine of the embodiment.

FIG. 2 is a cross-sectional view of the electric valve device 1 of the internal-combustion engine of the embodiment. As shown in FIG. 2, the electric valve device 1 includes a solenoid 10 which moves a plunger 13 in the axial direction, an inflow side pipe portion 50, an outflow side pipe portion 60, and a valve body 70. Each structural component is described below in detail.

<Solenoid 10>

The solenoid 10 which is used as a driving portion includes a case 30, a bobbin 25, a core 17, a yoke 21, the plunger 13 and the like.

(Case 30)

The bottomed cylindrical case 30 equipped with a bottom portion 30a is made of magnetic metal material such as a material obtained by galvanizing a cold-rolled steel sheet. The case 30 includes the bottom portion 30a disposed on the rear side of the axial direction and a caulking portion 30b arranged on an end portion on the front side of the axial direction. The shape of the cylindrical 30 is not limited to a precise cylindrical shape. The shape may be a shape having a polygonal cross-section. In other words, the structure of the case 30 may be a hollow structure in which the cross section is polygonal. Not limited to the case 30, other cylindrical members of the members of the solenoid 10 may also have a hollow structure in which the cross section is polygonal.

The cylinder body and the bottom portion 30a of the cylindrical case 30 are made of the same magnetic metal material and are molded in the same molding process. The cylinder body and the bottom portion 30a may also be molded in different molding processes, and the bottom portion 30a may be assembled to the cylinder body in a subsequent process.

(Bobbin 25)

A coil 29 for generating a magnetic force is wound on the bobbin 25 which is made of nonmagnetic resin material such as nylon that contains carbon fiber. The cylindrical bobbin 25 is disposed in the cylinder of the case 30.

(Core 17)

The core 17 which is made of magnetic material such as iron or the like includes a flange portion 17a expanding outward in the radial direction on the front side of the axial direction. The portion of the cylindrical core 17 excluding the flange portion 17a is a body portion 17b. The rear side of the body portion 17b in the axial direction penetrates a through hole arranged in the case 30 from the outside of the case 30, and is located in the cylinder of the bobbin 25 in the case 30. In the cylinder of the bobbin 25, the outer peripheral surface of the body portion 17b is in close contact with the inner peripheral surface of the bobbin 25.

Outside the case 30, the flange portion 17a of the core 17 is pressed against the outer surface of the case 30. The front side end portion of the core 17 is located in a through hole arranged in the inflow side pipe portion 50. The flange portion 17a of the core 17 is sandwiched between the bottom portion 30a of the case 30 and the inflow side pipe portion 50.

(Yoke 21)

The cylindrical yoke 21 which is made of magnetic material such as galvanized iron or the like is located on the rear side of the bobbin 25 in the axial direction in the cylinder of the case 30. The yoke 21 and the bobbin 25 are the same in inner-diameter and are disposed coaxially.

(Plunger 13) The plunger 13 which is made of magnetic material such as iron or the like can move axially in the cylinder of the yoke 21 and the bobbin 25, and is guided by the yoke 21 and the bobbin 25 to move toward the axial direction.

(Slide Bearing)

The core 17 includes a through hole along a central axis line. A cylindrical front side slide bearing 27 is pressed into the front side in the through hole of the core 17. A cylindrical rear side slide bearing 28 is pressed into the rear side in the through hole of the core 17. Both the front side slide bearing 27 and the rear side slide bearing 28 are made of nonmagnetic material such as aluminum bronze or the like.

(Shaft 11)

The shaft 11 is made of metal material such as a material obtained by nitrifying stainless steel. The shaft 11 penetrates through the cylinders of the front side slide bearing 27 and the rear side slide bearing 28. The rear side end portion in the axial direction of the shaft 11 is pressed into the through hole arranged in the plunger 13. The front side end portion in the axial direction of the shaft 11 is pressed into a concave portion of the valve body 70 described later. The shaft 11 can be guided by the front side slide bearing 27 and the rear side slide bearing 28 to move toward the axial direction, and can move axially along with the plunger 13.

When a set of the shaft 11 and the plunger 13 moves in the axial direction, the valve body 70 into which the shaft 11 is pressed also moves integrally in the axial direction outside the solenoid 10.

(Coil 29)

The coil 29 is wound on the bobbin 25. The coil 29 is wound in the peripheral direction along the outer peripheral surface of the radial outside of a cylinder portion 25a of the bobbin 25. Both end portions of the coil 29 are electrically connected to a terminal 38.

(Mold 26)

A mold 26 made of resin material such as polyester or the like is disposed in the front side end portion in the axial direction of the solenoid 10. The flange portion of the outflow side pipe portion 60 is clamped between the flange portion 17a of the core 17 and the front side end portion in the axial direction of the case 30 in a state that the end portion of the case 30 is swaged as the caulking portion 30b. The solenoid 10 is fixed to the outflow side pipe portion 60 by the clamping.

<Pipe Portion>

A pipe portion includes the inflow side pipe portion 50 and the outflow side pipe portion 60.

(Inflow Side Pipe Portion 50)

A pipe of the fresh air passage extending from the intake passage 110 is connected to the inflow side pipe portion 50 which is made of metal material such as aluminum alloy or the like. Fresh air flows into the inflow side pipe portion 50 extending in the X-axial direction. Besides, the configuration of the inflow side pipe portion 50 is described later in detail.

(Outflow Side Pipe Portion 60)

A pipe in the fresh air passage 120 which extends toward the crankcase 102 of the internal-combustion engine 100 is connected to the outflow side pipe portion 60 which is made of metal material such as aluminum alloy or the like. The fresh air in the inflow side pipe portion 50 flows into the outflow side pipe portion 60 extending in the X-axial direction. The outflow side pipe portion 60 overlaps the inflow side pipe portion 50 in the axial direction.

The inflow side pipe portion 50 is located closer to the axial front side than the outflow side pipe portion 60. The solenoid 10 is located closer to the axial rear side than the outflow side pipe portion 60.

The inflow side pipe portion 50 and the outflow side pipe portion 60 are partitioned by a barrier 75. A first opening 75a is arranged on the barrier 75. The inflow side pipe portion 50 and the outflow side pipe portion 60 are in communication via the first opening 75a.

Inside the outflow side pipe portion 60, a coil spring 90 extending axially is disposed. The valve body 70 is inserted into the rear side end portion in the axial direction of the coil spring 90. The coil spring 90 energizes the valve body 70 from the front side toward the rear side in the axial direction.

The valve body 70 which moves along with the shaft 11 and the plunger 13 to the front side of the axial direction is in close contact with the surrounding surface of the first opening 75a arranged on the barrier 75 to block the first opening 75a. As shown in FIG. 2, the valve is closed when the valve body 70 blocks the first opening 75a. When the valve is closed, the communication between the inflow side pipe portion 50 and the outflow side pipe portion 60 via the first opening 75a is cut off, and thus an inflow of fresh air from the inflow side pipe portion 50 to the outflow side pipe portion 60 is prevented.

Besides, instead of connecting the solenoid 10 to the inflow side pipe portion 50, the solenoid 10 may be connected to the outflow side pipe portion 60.

When a current flows to the coil 29 of the solenoid 10 by energization, a magnetic circuit is generated around the coil 29. Then, the plunger 13 is drawn from the rear side to the front side of the axial direction by a magnetic force. At this time, the plunger 13 presses the shaft 11 and the valve body 70 against an urging force of the coil spring 90 disposed in the outflow side pipe portion 60 and moves the shaft 11 and the valve body 70 to the front side of the axial direction. On the other hand, when the energization to the coil 29 is stopped, the magnetic circuit around the coil 29 disappears. Then, the plunger 13 which is drawn to the front side of the axial direction by the magnetic force moves with the valve body 70 and the shaft 11 to the rear side of the axial direction due to the urging force of the coil spring 90. By this movement, the first opening 75a of the barrier 75 is exposed, and the fresh air in the inflow side pipe portion 50 flows into the outflow side pipe portion 60.

The fresh air passage 120 includes a pipe 121 which is connected to the inflow side pipe portion 50 of the electric valve device 1 and joins the intake passage 110 and the inflow side pipe portion 50. Due to restoration forgetting after a maintenance checkup, a shock-induced dropout or the like, the inflow side pipe portion 50 of the electric valve device 1 detaches from the pipe 121. Then, air in an engine room of the vehicle flows directly into the inflow side pipe portion 50 of the electric valve device 1. Then, pressure changes of the crankcase 102 when the electric valve device 1 is closed are not detected properly, and thus the accuracy of detecting whether there is a gas leakage from the blow-by gas passage 115 is reduced.

Therefore, separately from a passage 51 which communicates with the outflow side pipe portion 60 through the first opening 75a of the barrier 75, the inflow side pipe portion 50 of the internal-combustion engine 100 of the embodiment includes a bypass path 52 which communicates with the inflow side pipe portion 50 through a second opening 61 arranged on the wall of the outflow side pipe portion 60.

An inlet 52a of the bypass path 52 opens toward the radial outside of the inflow side pipe portion 50 on the downstream side of an inlet 51a of the passage 51 of the inflow side pipe portion 50 in the movement direction of fresh air. The inlet 52a is blocked by an inner peripheral wall of the pipe 121 in an overlapped portion 124 in the Z-axis direction (the radial direction of the inflow side pipe portion) between the pipe 121 and the inflow side pipe portion 50.

<Operation and Effect of Internal-Combustion Engine 100 of Embodiment>

(1) In the internal-combustion engine 100 of the embodiment, when the inflow side pipe portion 50 of the electric valve device 1 detaches from the pipe 121 of the fresh air passage 120, the inlet 52a of the bypass path 52 of the inflow side pipe portion 50 is exposed outside. When the electric valve device 1 is closed in a state that the inlet 52a is exposed outside, air flows into the outflow side pipe portion 60 through the bypass path 52, and thus the pressure in the crankcase 102 is not easy to be negative.

According to the internal-combustion engine 100 of the embodiment, as described above, the difficulty of being a negative pressure can be detected by the pressure sensor 118, and thereby the situation that the inflow side pipe portion 50 of the electric valve device 1 detaches from the pipe 121 of the fresh air passage 120 can be detected.

Besides, if the fresh air in the pipe 121 of the fresh air passage 120 flows into the outflow side pipe portion 60 through the bypass path 52 when the electric valve device 1 is closed, the fresh air flows into the outflow side pipe portion 60 regardless of whether the electric valve device 1 is closed or opened. In order not to make the fresh air flow into the outflow side pipe portion 60 when the electric valve device 1 is closed, it is desirable to adopt the following configuration. That is, along with the movement of the inflow side pipe portion 50 of the electric valve device 1 in a direction of detaching from the pipe 121 of the fresh air passage 120, the inlet 52a of the bypass path 52 of the inflow side pipe portion 50 gets away from a blocking member that blocks the inlet 52a until then and the inlet 52 opens. The blocking member includes the inner peripheral wall of the pipe 121, a plug member 122 described later and the like.

Figure 3:
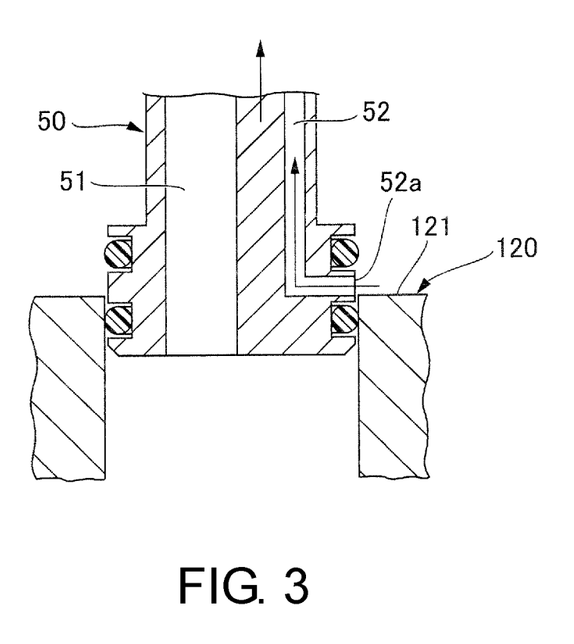
FIG. 3 is a cross-sectional view showing an inflow side pipe portion of the electric valve device of the embodiment in a state of being about to detach from a pipe of a fresh air passage.

(2) In the internal-combustion engine 100 of the embodiment, the inlet 52a of the bypass path 52 is blocked by the inner peripheral wall of the pipe 121 in the overlapped portion 124 between the inflow side pipe portion 50 of the electric valve device 1 and the pipe 121 of the fresh air passage 120. When the inflow side pipe portion 50 of the electric valve device 1 is about to detach from the pipe 121 of the fresh air passage 120, as shown in FIG. 3, the inlet 52a of the bypass path 52 is dropped out of the pipe 121 of the fresh air passage 120 and is exposed outside. Accordingly, external air flows into the bypass path 52 through the exposed inlet 52a. Therefore, according to the internal-combustion engine 100 of the embodiment, the tendency that the inflow side pipe portion 50 of the electric valve device 1 is about to detach from the pipe 121 of the fresh air passage 120 can be detected before the detachment. In addition, according to the internal-combustion engine 100 of the embodiment, cost reduction can be achieved by utilizing the pipe 121 of the fresh air passage 120 to block the inlet 52a of the bypass path 52.

Variants in which part of the configurations of the internal-combustion engine 100 of the embodiment is changed into other configurations are described below. Besides, unless otherwise stated below, the configuration of the internal-combustion engine 100 of each variant is similar to the embodiment.

[First Variant]

Figure 4:
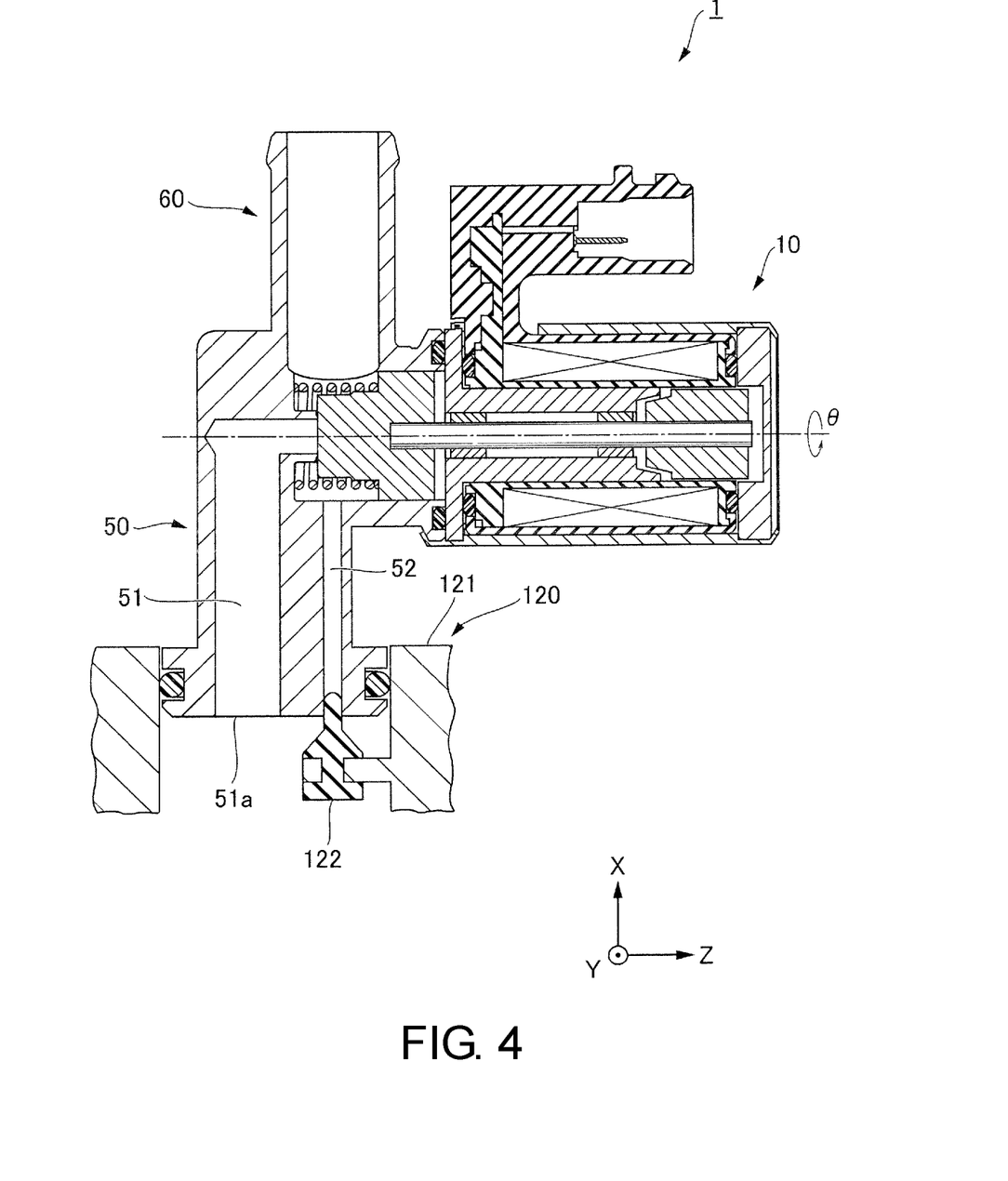
FIG. 4 is a cross-sectional view of an electric valve device of an internal-combustion engine of a first variant.

FIG. 4 is a cross-sectional view of the electric valve device 1 of the internal-combustion engine 100 of a first variant. The configurations of the solenoid 10 and the outflow side pipe portion 60 in the electric valve device 1 are the same as the embodiment.

An inlet (the symbol 52a in FIG. 5 described later) of the bypass path 52 of the inflow side pipe portion 50 opens toward the inflow side of fresh air used as a fluid in the pipe 121. A plug member 122 which is inserted from the inlet into the bypass path 52 to block the inlet (52a) is arranged on the inner wall of the pipe 121.

<Operation and Effect of Internal-Combustion Engine 100 of First Variant>

Figure 5:
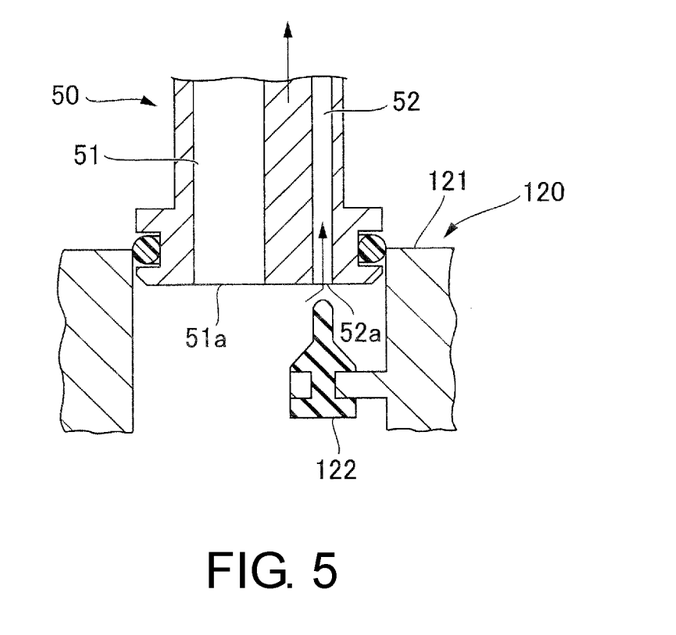
FIG. 5 is a cross-sectional view showing an inflow side pipe portion of the electric valve device of the first variant in a state of being about to detach from a pipe of a fresh air passage.

In the internal-combustion engine 100 of the first variant, the plug member 122 arranged in the pipe 121 of the fresh air passage 120 blocks the inlet of the bypass path 52 of the inflow side pipe portion 50. When the inlet is blocked in this way, as shown in FIG. 5, the inlet 52a of the bypass path 52 detaches from the plug member 122 and opens before the inflow side pipe portion 50 of the electric valve device 1 detaches from the pipe 121 of the fresh air passage 120. Accordingly, the fresh air in the pipe 121 of the fresh air passage 120 flows into the bypass path 52 through the opened inlet 52a.

Therefore, according to the internal-combustion engine of the first variant, the tendency that the inflow side pipe portion 50 of the electric valve device 1 is about to detach from the pipe 121 of the fresh air passage 120 can be detected before the detachment.

[Second Variant]

Figure 6:
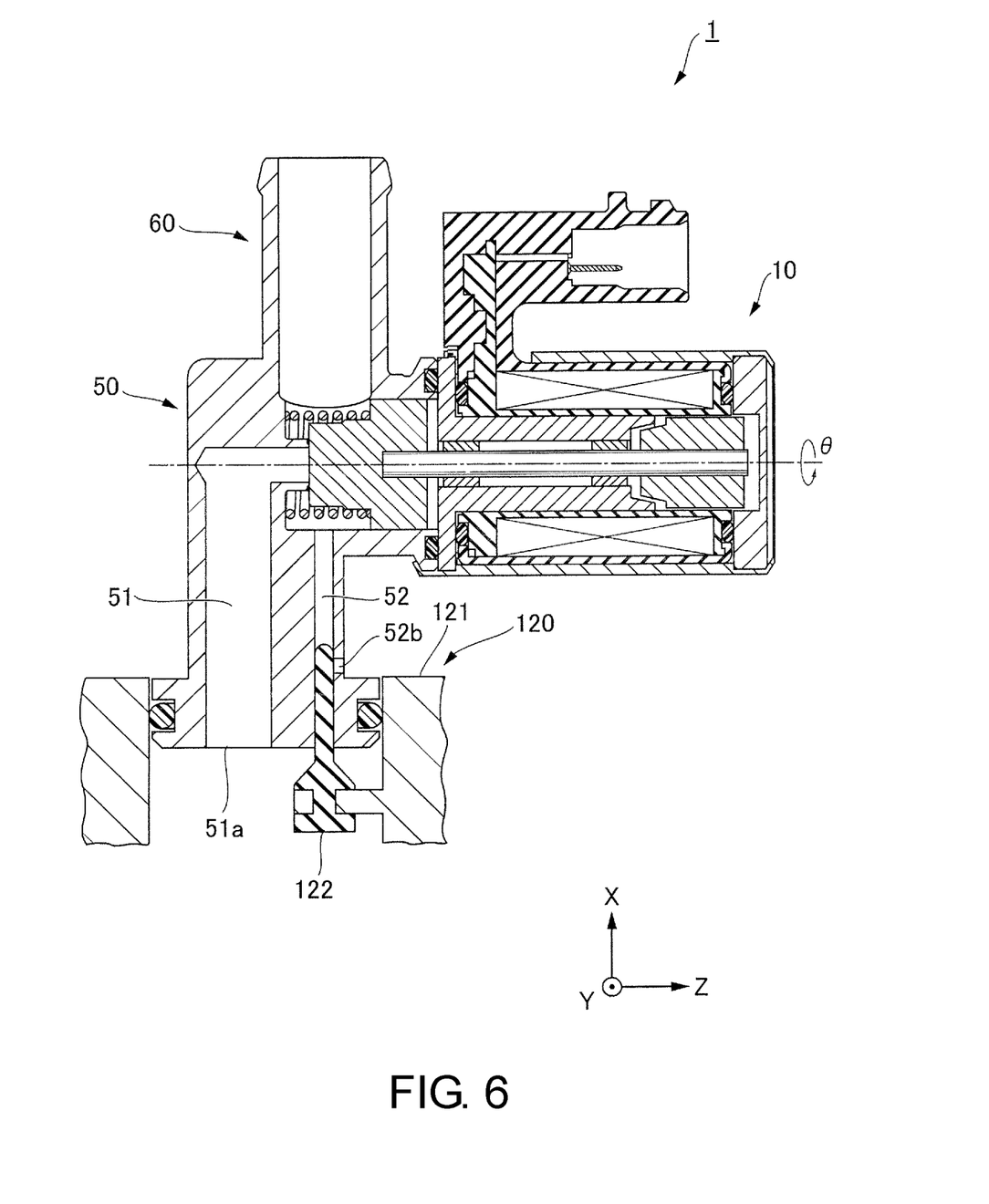
FIG. 6 is a cross-sectional view of an electric valve device of an internal-combustion engine of a second variant.

FIG. 6 is a cross-sectional view of the electric valve device 1 of the internal-combustion engine 100 of a second variant. The configurations of the solenoid 10 and the outflow side pipe portion 60 in the electric valve device 1 are the same as the embodiment.

The bypass path 52 of the inflow side pipe portion 50 includes a first inlet (the symbol 52b of FIG. 7 described later) which opens toward the inflow side of fresh air in the pipe 121 and a second inlet 52c which opens toward the radial outside of the inflow side pipe portion 50 on the downstream side of the first inlet (52b). The plug member 122 which is inserted from the first inlet (52b) into the bypass path 52 to block the first inlet (52b) and the second inlet 52c is arranged on the inner wall of the pipe 121.

<Operation and Effect of Internal-Combustion Engine 100 of Second Variant>

Figure 7:
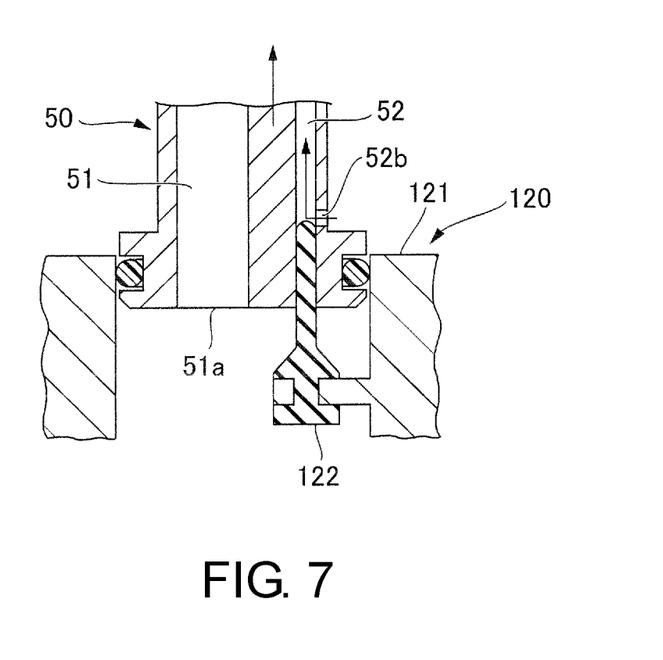
FIG. 7 is a cross-sectional view showing an inflow side pipe portion of the electric valve device of the second variant in a state of being about to detach from a pipe of a fresh air passage.

In the internal-combustion engine 100 of the second variant, the plug member 122 arranged in the pipe 121 of the fresh air passage 120 blocks the first inlet (52b) and the second inlet 52c of the bypass path 52 of the inflow side pipe portion 50 of the electric valve device 1. When both of the inlets are blocked in this way, as shown in FIG. 7, the second inlet 52c of the bypass path 52 detaches from the plug member 122 and opens before the inflow side pipe portion 50 of the electric valve device 1 detaches from the pipe 121 of the fresh air passage 120. External air flows into the bypass path 52 through the opened second inlet 52c.

Therefore, according to the internal-combustion engine of the second variant, the tendency that the inflow side pipe portion 50 of the electric valve device 1 is about to detach from the pipe 121 of the fresh air passage 120 can be detected before the detachment.

The embodiments and examples of the disclosure are described above, but the disclosure is not limited to the above embodiments and can be variously modified and altered within the scope of the gist of the disclosure. The embodiments and modifications thereof are included in the scope and the gist of the disclosure and are also included in the invention described in the claim and equivalent scopes thereof.

What is claimed is:

1. A fresh air passage mechanism, comprising:

a fresh air passage for sending air to a crankcase from an upstream side of a throttle valve in an intake path of an internal-combustion engine;

wherein an electric valve device is arranged in the fresh air passage;

the fresh air passage comprises a pipe which is connected to an inflow side pipe portion of the electric valve device and joins the intake path and the inflow side pipe portion; and an inlet of the bypass path is blocked by the pipe in an overlapped portion between the pipe and the inflow side pipe portion, wherein the electric valve device, comprising: the inflow side pipe portion, an outflow side pipe portion, a barrier which partitions off the inflow side pipe portion from the outflow side pipe portion, a valve body which opens and closes an opening arranged on the barrier by moving in an axial direction, and a driving portion which drives the valve body;

wherein the inflow side pipe portion comprises a passage which communicates with the outflow side pipe portion through the opening treated as a first opening and a bypass path which is separated from the passage and communicates with the inflow side pipe portion through a second opening.

2. The fresh air passage mechanism according to claim 1, wherein the inlet of the bypass path opens toward a radial outside of the inflow side pipe portion on a downstream side of an inlet of the passage of the inflow side pipe portion.

3. The fresh air passage mechanism according to claim 1, wherein the inlet of the bypass path opens toward an inflow side of a fluid.

4. The fresh air passage mechanism according to claim 1, wherein the bypass path comprises the inlet which opens toward an inflow side of a fluid and a second inlet which opens toward a radial outside of the inflow side pipe portion on a downstream side of the first inlet.

* * * * *